No. 808,257. PATENTED DEC. 26, 1905.
C. J. REED.
LATHE MANDREL.
APPLICATION FILED MAR. 15, 1905.

Witnesses:
Geo. E. Garrett
J. B. Hill

Inventor:
Charles J. Reed,
by Byrnes & Townsend,
Attys.

UNITED STATES PATENT OFFICE.

CHARLES J. REED, OF PHILADELPHIA, PENNSYLVANIA.

LATHE-MANDREL.

No. 808,257.      Specification of Letters Patent.      Patented Dec. 26, 1905.

Application filed March 15, 1905. Serial No. 250,297.

*To all whom it may concern:*

Be it known that I, CHARLES J. REED, a citizen of the United States, residing at Philadelphia, in the county of Philadelphia and State of Pennsylvania, have invented certain new and useful Improvements in Lathe-Mandrels, of which the following is a specification.

This mandrel is designed to axially support between lathe-centers and present to the cutting-tool circular tubes of various diameters and lengths.

The mandrel comprises a straight rod the ends of which are counterbored to receive the lathe-centers, and a pair of chucks which are adjustably mounted on the rod and provided with means for clamping them in adjusted position. The chucks have radially-movable jaws, with a series of seats to enter and support tubes of different diameter.

Figure 1:
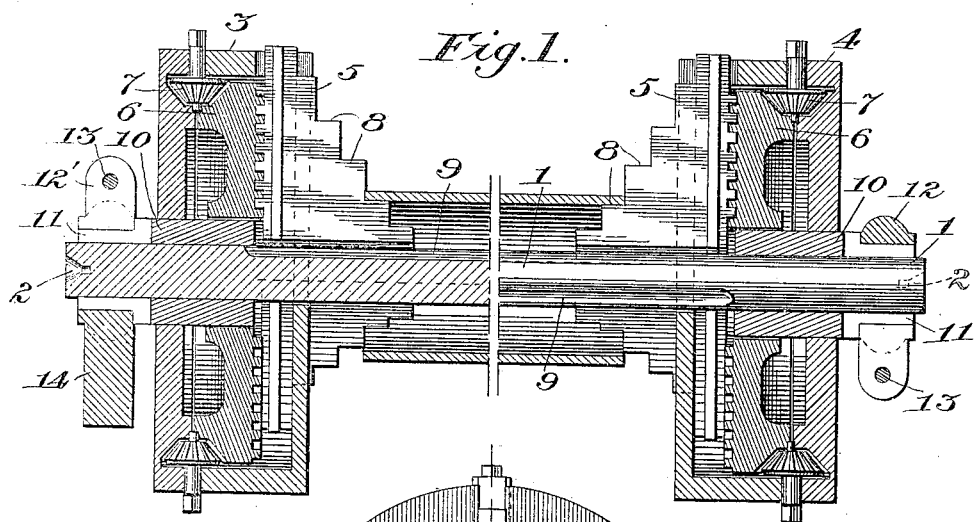
Figure 2:
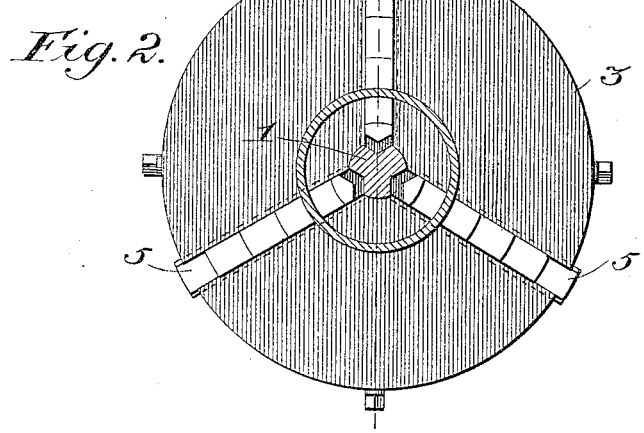
Figure 3:
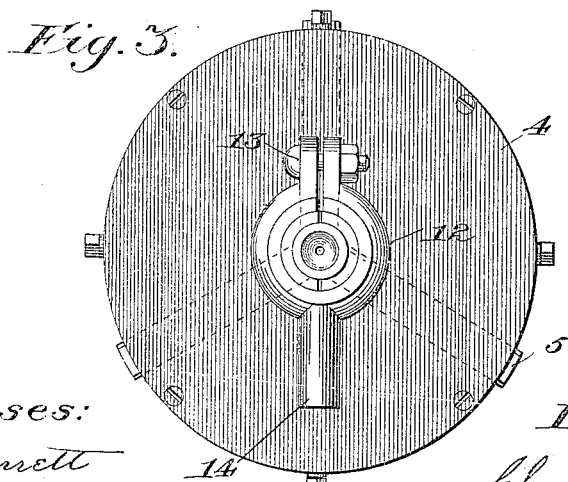

Referring to the acccompanying drawings, Figure 1 is a vertical axial section of the mandrel and a tube-supported thereby, the middle portion of the support-rod and tube being broken out. Fig. 2 is a transverse vertical section of the parts shown in Fig. 1 in a plane between the chucks, and Fig. 3 is a rear elevation of the chuck shown at the left in Fig. 1.

The mandrel comprises a straight and preferably cylindrical rod 1, the ends of which have counterbored recesses 2 to receive the lathe-centers. Adjustably mounted on the rod are two scroll-chucks 3 4, each having three or more radially-movable jaws 5, actuated by a scroll-plate 6 and bevel-pinions 7. Each jaw has a series of steps 8, arranged to enter and bear against the inner surface of tubes of different diameter. The rod has longitudinal grooves 9, which enable the jaws to be moved inward until their first step is flush with the surface of the rod. Each chuck is carried by a sleeve 10, which smoothly fits the rod 1 and has an outer split end 11, surrounded by a split ring 12 or 12', having a clamping-bolt 13. The clamping-ring 12' of one chuck has an arm 14 to bear against a pin projecting from the face-plate of the lathe.

To seat a tube upon the mandrel, one of the chucks is unclamped and slipped off the rod. The tube is slipped over the rod until its end is received by the seats of the other chuck. The jaws of this chuck are then forced outward until they bear on the inner surface of the tube. The detached chuck is then replaced on and moved along the rod until its jaw-seats enter the end of the tube, whereupon the chuck is clamped on the rod and the jaws are forced outward against the tube. The mandrel is then supported on the lathe-centers, the arm 14 on the ring 12' bearing against a projection on the face-plate and serving to rotate the mandrel.

To accommodate rods of different length, it is desirable to provide each pair of chucks with a series of interchangeable rods of different length. Different pairs of chucks may also be provided for use on the same rod or set of rods to support tubes of widely-different diameter.

I claim—

1. A mandrel, comprising a rod and chucks adjustably mounted on said rod, said chucks comprising outwardly-movable jaws having seats to receive the end of a tube and means for clamping said chucks in adjusted position, as set forth.

2. A mandrel, comprising a rod and chucks adjustably mounted on said rod, said chucks comprising outwardly-movable jaws having seats to receive the end of a tube, split sleeves, and clamping-rings on said sleeves, as set forth.

In testimony whereof I affix my signature in presence of two witnesses.

CHARLES J. REED.

Witnesses:
WILLIAM A. ROBBINS,
J. W. RITTER.